United States Patent [19]
Blasse et al.

[11] Patent Number: 5,140,159
[45] Date of Patent: Aug. 18, 1992

[54] REPRODUCTION OF X-RAY IMAGES WITH PHOTOSTIMULABLE PHOSPHOR

[75] Inventors: George Blasse, Bunnik; Andries Meijerink, Wijk bij Duurstede, both of Netherlands; David R. Terrell, Lint; Lodewijk M. Neyens, Kontich, both of Belgium

[73] Assignee: Agfa-Gevaert, N.V., Mortsel, Belgium

[21] Appl. No.: 389,792

[22] Filed: Aug. 4, 1989

[30] Foreign Application Priority Data

Aug. 5, 1988 [EP] European Pat. Off. ........ 88201693.4

[51] Int. Cl.$^5$ .................... G01N 23/04; C09K 11/63
[52] U.S. Cl. .............. 250/327.2; 250/484.1; 252/301.4 H
[58] Field of Search ............ 252/301.4 H; 250/327.2, 250/484.1

[56] References Cited

FOREIGN PATENT DOCUMENTS 53-147690 12/1978 Japan ............................ 252/301.4 H
55-92789  7/1980 Japan ............................ 252/301.4 H

*Primary Examiner*—Jack Cooper
*Attorney, Agent, or Firm*—Breiner & Breiner

[57] ABSTRACT

A method for recording and reproducing an X-ray image is provided which method comprises the steps of:
(1) causing a photostimulable phosphor to absorb image-wise or pattern-wise modulated X-rays,
(2) photostimulating said phosphor with stimulating electromagnetic radiation selected from visible light and infrared light to release from the phosphor in accordance with the absorbed X-rays electromagnetic radiation different in wavelength characteristic from the radiation used in the photo-stimulation, and
(3) detecting said light emitted by photostimulation, wherein said phosphor is a haloborate.

9 Claims, 9 Drawing Sheets

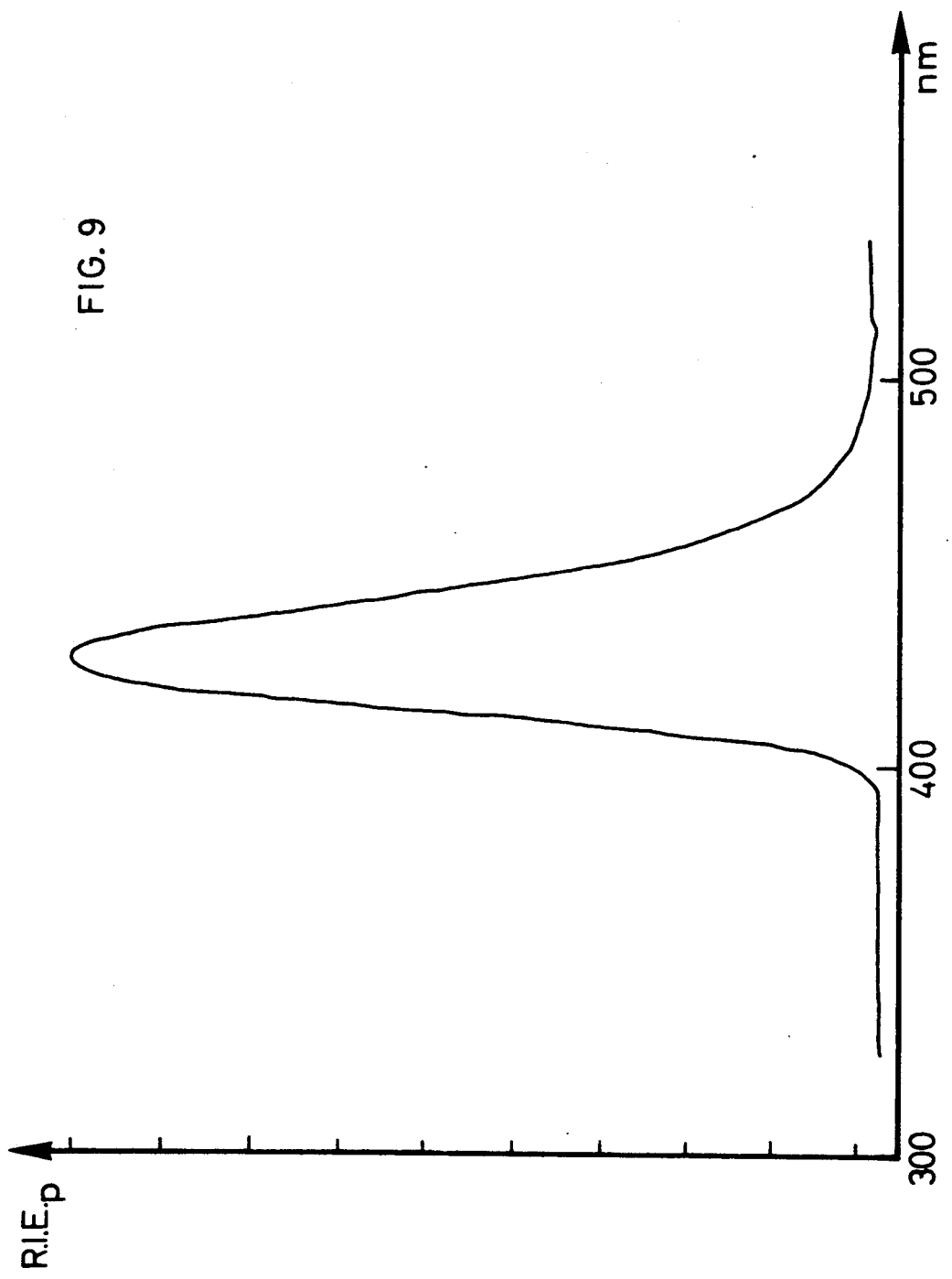

REPRODUCTION OF X-RAY IMAGES WITH PHOTOSTIMULABLE PHOSPHOR

DESCRIPTION

This invention relates to a photostimulable haloborate phosphor and to a method of recording and reproducing an X-ray pattern by means of a binder layer containing said phosphor in a screen or panel.

It is well known that X-rays can cause appropriate substances to luminesce. Substances showing the phenomenon of luminescence under the influence of X-rays are called phosphors.

According to a classical method of recording and reproducing an X-ray pattern phosphors are used to form radiographs in conjunction with photographic silver halide emulsion materials being highly sensitive to the emitted fluorescent light.

The phosphors used in said screens should be luminescent but not exhibit appreciable long lived emission after the X-ray source is switched off. If a screen with marked-long lived emission were to be used, it would retain its image after the X-ray beam had ceased and fresh film contacted with it would gain a so-called ghost impression that would interfere with the next image to be made. This phenomenon being undesirable in the production of radiographs by contact exposure with a fluorescent X-ray conversion screen is known under the terms "after-glow" and "lag".

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

As described in U.S. Pat. No. 4,239,968 europium-doped barium fluorohalides are particularly useful for applicaiton as stimulable phosphors for their high sensitivity to stimulating light of a He-Ne laser beam (633 nm), ruby laser beam (694 nm) and YAG laser beam (1064 nm), the optimum of stimulation being in the range of 500 to 700 nm. The light emitted on stimulation, called stimulated light is situated in the wavelength range of 350 to 450 nm with its main peak at 390 nm (ref. the periodical Radiology, Sep. 1983, p. 834).

As described in said periodical the imaging plate containing the stimulable phosphor can be used repeatedly to store X-ray images simply by flooding it with light to erase the residual energy it contains.

As can be learned from DE-OS 3,347,207 europium-doped barium fluorohalides are chemically not stable and are more particularly sensitive to moisture which according to experiments affects their fluorescence power.

Classical X-ray phosphors by virtue of the fact that they reemit promptly most of the absorbed energy and store very little are unsuitable as storage phosphors. So, there is still an intensive research going on to fine phosphors that fulfil the requirements related to efficient X-ray energy storage, photo-stimulatability and moisture resistance.

Haloborate phosphors doped with divalent europium have been reported previously by T. E. Peters and J. Baglio in the Journal of Inorganic and Nuclear Chemistry, volume 32, pages 1089 to 1095 (1970) and by K. Machida, G. Adachi, N. Yasuoka, N. Kasai and J. Shiokawa in Inorganic Chemistry, volume 19, pages 3807 to 3811 (1980) to be efficient photo-excitable and less efficient cathode ray-excitable phophors. V. G. Kronganz, I. G. Kaplenov and A. T. Merzlyakov in Izvestya Akademii Nauk. SSSR, Seriya Fizucheskaya, volume 38, pages 1145 to 1150 (1974) reported the X-ray luminescent properties of $Ca_2B_5O_9Cl$ doped with lead, said phosphor showing a high ratio of stored light to stationary intensity (prompt emission), but poor relative increase in intensity under the influence of stimulating light.

M. D. Khalupouskii, L. P. Benderskaya, V. I. Ishunin and G. Ya. Goncharova in Sb. Nauchn. Tr., Vses Nauchno-Issled. Instit. Lyuminoforov. Osobo Christ. Veschestv. volume 11, pages 7 to 11 (1974) reported the photoluminescent properties of manganese-activated calcium and strontium chloroborates, type $Me_2B_5O_9Cl$.

In none of these publications are haloborate phosphors reported as exhibiting efficient X-ray energy storage and stimulability with visible or infrared light. The stimulability of lead-doped $Ca_2B_5O_9Cl$ phosphors is so poor that such phosphors are useless as photostimulable phosphors.

It is an object of the present invention to provide a process for recording and reproducing X-ray patterns wherein particular europium doped haloborate phosphors are used for efficiently storing energy from incident X-rays and releasing said energy in a high yield by photostimulation in the form of electronically detectable photons of shorter wavelength than the light used in the photostimulation.

It is a further object of the present invention to provide an X-ray screen or panel containing said photostimulable phosphor dispersed in a binder layer.

Other objects and advantages of the present invention will become clear from the following description.

In accordance with the present invention a method for recording and reproducing an X-ray image is provided which comprises the steps of:

(1) causing a photostimulable phosphor to absorb image-wise or pattern-wise modulated X-rays, (2) photostimulating said phosphor with stimulating electromagnetic radiation selected from visible light and infrared light to release from the phosphor in accordance with the absorbed X-rays electromagnetic radiation different in wavelength characteristic from the radiation used in the photostimulation, and (3) detecting said light emitted by photostimulation, characterized in that said phosphor is a haloborate corresponding to the following empirical formula (I):

$$M_{2-x}B_5O_{9.5-y/2}X_y \cdot D_x$$

wherein:
M is at least one of the alkaline earth metals selected from the group consisting of Ca, Sr and Ba, X is at least one of halogen selected from the group consisting of Cl, Br and I, D is a dopant being at least one rare earth metal selected from the group consisting of $Eu^{2+}$ and $Ce^{3+}$, optionally in combination with at least one co-dopant being a member selected from the group consisting of La, Y, Sc and the lanthanide elements except $Eu^{2+}$ and $Ce^{3+}$ or one or more alkali elements selected from the group consisting of Na, K, Rb and Cs, x is in the range $5 \times 10^{-5} \leq x < 4 \times 10^{-1}$, and y is in the range $0.4 \leq y \leq 1.6$.

The presence of a mixture of dopants D wherein different elements as defined above are used and/or same elements of different chemical valency provides a strong photostimulable luminescence after X-ray irradiation.

A preferred photostimulable phosphor according to the above empirical formula (I) is a haloborate wherein M is at least one element of the group consisting of Sr and Ba; X is at least one element of the group consisting of Cl and Br; D represents a member selected from the group consisting of $Eu^{2+}$ and $Ce^{3+}$ optionally in combination with at least one member selected from the group of La, Y, Sc and the lanthanide elements other than $Eu^{2+}$ and $Ce^{3+}$ or one or more alkali elements selected from the group consisting of Na and K, and x is in the range $10^{-4} \leq x \leq 5 \times 10^{-2}$ and y is in the range $0.4 \leq y \leq 1.6$.

A particularly preferred photostimulable phosphor for use according to the present invention includes as co-dopant D one or more of gadolinium, yttrium, lanthanum, samarium and lutetium or one or more of the alkali elements selected from the group consisting of sodium and potassium.

The photostimulable phosphors suited for use according to the present invention can be prepared by firing mixtures of Ca, Sr and/or Ba halides, Ca, Sr and/or Ba oxygen-containing salts such as carbonate, nitrate and sulfate, $H_3BO_3$ and/or $B_2O_3$ and anhydrous and/or hydrated halides, oxides or oxygen-containing salts of the D element or elements, optionally in combination with ammonium bromide and/or ammonium chloride for periods of up to 40 hours at temperatures between 700° and 1000° C. Optionally one or more of the D elements can be incorporated being coprecipitated with Ca, Sr and/or Ba halides and/or oxygen-containing salts and/or oxides.

Excess $MX_2$ and/or one or more other flux, e.g. $(NH_4)_2CO_3$, $NH_4Br$, $NH_4Cl$, $H_3BO_3$ and $B_2O_3$ can be added to promote the formation of the haloborate phosphors.

For use in the method according to the present invention the photostimulable haloborate phosphor is preferably present in dispersed form in a binder layer that may be supported or self-supporting and forms a screen or panel, called X-ray image storage panel.

Suitable binders for forming a binder layer incorporating said phosphor in dispersed form are film forming organic polymers, e.g. a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 nm to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a carbon black containing layer or to use a coloured support e.g. a grey or black film support.

According to an embodiment of the above defined method for recording and reproducing an X-ray image the photostimulation of the phosphor-binder layer that has been image-wise or pattern-wise exposed with X-rays proceeds with a scanning light beam, preferably a laser light beam, e.g. a beam of a He-Ne or argon ion laser.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, September 1983, p. 833-838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On the phosphors of the present invention measurements have been carried out for determining their photo-physical properties.

First the emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filters are to be used in all the other measurements. A first filter transmits the emitted light obtained by photostimulation but filters out almost all of the stimulating light. For He-Ne laser stimulation a 2.5 mm HOYA B 390 filter is used, whose transmission spectra are described in the HOYA Color Filter Glass Catalogue No. 8503E published by the HOYA Corporation, Tokyo, Japan.

The prompt emission is measured by continuously exposing a screen to an X-ray source operating at 85 kV peak and 20 mA and monitoring the emission. For this purpose a MONODOR (trade name of Siemens AG—W. Germany) X-ray source was used. The low energy X-rays are filtered out from the X-ray spectrum with a 21 mm thick aluminium plate. The high voltage is sinusoidal with frequency of 50 Hz resulting in short X-ray pulses at a frequency of 100 Hz. The dose of a single pulse was determined by measuring the dose for a known time interval (1 second) and counting the number of pulses. The emission is measured through a 1.77 mm2 pinhole with a HAMAMATSU (trade name) R 1398 photomultiplier coupled to an amplifier and monitored with a TEKTRONIX (trade name) 7D20 digital oscilloscope. 100 pulses per second are detected. The trace of one of these is stored using the oscilloscope and the area beneath the curve is calculated. Since the sensitivity factors for the photomultiplier, amplifier and digitizer are known, the prompt emission energy per pulse can be calculated and the prompt emission efficiency in units of pJ/mm2/mR is obtained by dividing this value by the X-ray dose of the exciting pulse.

In the second measurement the total photostimulable energy stored upon exposure to a given X-ray dose is determined. Prior to X-ray excitation any residual energy still present in the phosphor screen is removed by irradiation. To avoid photoexcitation during erasure a cut-off SCHOTT GG435 filter described in Filterglas Catalogue No. 3531/4d published by SCHOTT GLASWERKE, Mainz, W.-Germany, which filter eliminates all wavelengths below 435 nm, is placed between a lamp emitting photostimulating light and the phosphor screen. The phosphor screen is then excited with an X-ray source operating at 85 kVp and 20 mA. For that purpose the MONODOR X-ray source of Siemens AG—W. Germany may be used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The lasers used in this measurement are the He-Ne (633 nm), argon ion (514 nm) and semi-conductor (750 and 820 nm) lasers.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multiprogrammer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 1.77 mm2 is exposed. Only half of the laser power (5 mW) reaches the screen surface. In this way the intensity of the stimulating beam is more uniform. A red filter (3 mm SCHOTT OG 590) placed immediately in front of the laser eliminates the weak ultraviolet components in the laser emission. The signal amplitude from the photomultiplier is linear with the intensity of the photostimulating light and with the stored photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $$f(t) = A \cdot e^{-t/\tau};$$

wherein A is the amplitude, $\tau$ is the time constant, t is stimulation time, and e is the base number of a natural logarithm.

The 1/e point is reached when $t = \tau \ln 2$ whereupon half of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission is detected by the photomultiplier. After all these corrections have been made a conversion efficiency value (C.E.) is obtained in pJ/mm2/mR. This value varies with screen thickness and therefore for measurements to be comparable they have to be carried out at constant phosphor coverage.

The photostimulation energy is defined as the energy necessary to stimulate half the stored energy and is expressed in µJ/mm2.

In a third measurement the response time is determined. This is measured by stimulating the phosphor screen with short light pulses. The laser light is modulated with an acousto-optical modulator. The rise time of the stimulating light is 15 ns. The emitted light is measured with a photomultiplier (Hamamatsu R 1398) with a small anode resistor (150 ohm) to obtain a wide bandwidth (10 MHz). The rise time of the measurement system itself is 35 ns. The response time is the time to reach half of the maximum intensity of the emitted light and is designated t1/2.

In a fourth measurement the stimulation spectrum is determined. The light of a tungsten (quartz-iodine) lamp is fed into a monochromator (Bausch and Lomb—W. Germany) and then mechanically chopped with a rotating wheel with a single hole. The lamp provides a continuous spectrum extending from the near UV through the visible spectrum into the infrared. The 33-86-02 grating from Bausch and Lomb is a 1350 li-ne/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused due to e.g. the dark curent of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

In a fifth measurement the dependence of the conversion efficiency upon the time between X-ray exposure and stimulation (so-called "dark-decay") was determined at room temperature. It was evaluated by exciting the phosphor with a high dose of X-rays, inserting the samples in a black box to avoid unintentional light exposure and periodically stimulating with a light (650 nm) emitting diode (LED) source with short (20 μs) low power pulses controlled by a function generator. Normally a burst of 8 pulses is given per time interval. The energy of all the pulses together is so low that only 1% of the amount of stored energy is stimulated during the determination. The emitted light is separated from the stimulating light using a SCHOTT BG-3 or HOYA B390 filter and is amplified with a photomultiplier and a sensitive electronic amplifier. The pulses are monitored using a digital oscilloscope and the average pulse from the 8 pulse burst is sent to the ordinator to calculate the amplitude of the signal. If this amplitude does not match the sensitivity of the oscilloscope, the sensitivity is changed automatically and the measurement is started again. Measurements lasting 100 h or more can be carried out depending on the time interval between the bursts of the pulses (normally 30 minutes). The ordinator stores all the measurements in its memory and when the measurement is completed the so-called dark-decay curve is plotted out.

The present invention is illustrated by the following examples wherein reference is made to curves represented in FIGS. 1 to 9. The examples are not limiting in any way. In the examples the percentages and ratios are by weight unless otherwise mentioned. The atomic weight percentages relate to gram-atom of a particular D dopant relative to the total gram-atoms of all the dopants together.

FIG. 1 relates to the X-ray diffraction spectrum (XRD spectrum) of a haloborate phosphor according to the present invention obtained by the procedure of Example 1. In this FIG. 1 peak intensity (P.I.) is plotted against 2×Theta (2θ), being the angle in degrees at which the peaks are observed.

FIGS. 2, 6, 7 and 9 represent "prompt" emission spectra of the phosphors described in the correlated Example. In the diagrams the relative intensity of the prompt emission (R.I.E.$_p$) is in the ordinate and the wavelength range in nm is in the abscissa.

EXAMPLE 1

Figure 1:
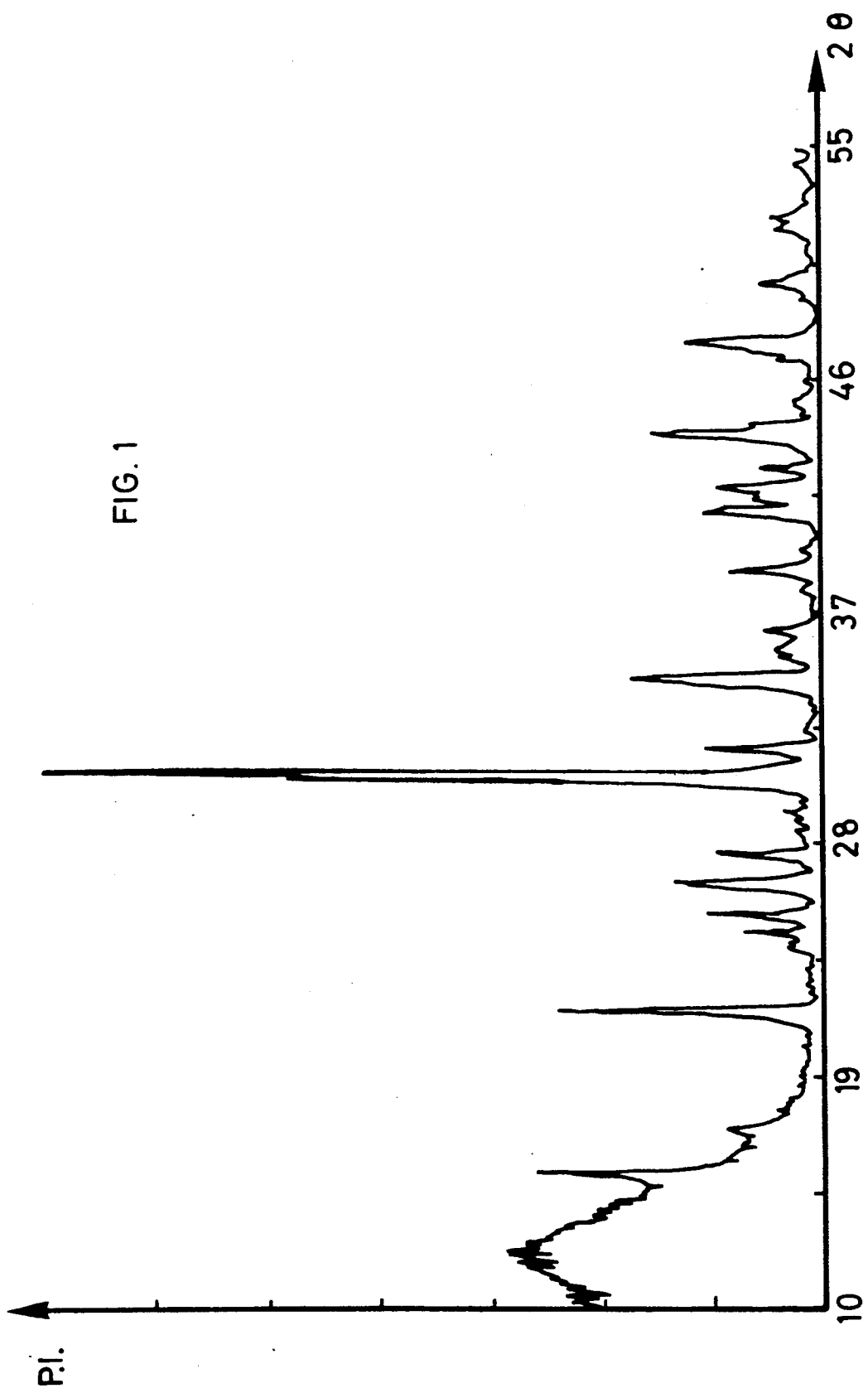

6.9704 g of $BaCO_3$, 0.01408 g of $Eu_2O_3$, 3.4960 g of $B_2O_3$, 1.53258 g of $BaBr_2 \cdot 2 H_2O$ and 2.4290 g of $NH_4Br$ were mixed for 15 minutes with 7 ml of ethanol in a planetary ball mill. The mixture was fired in an aluminium oxide crucible for 6 hours at 850° C. in a double crucible arrangement with 7 g of charcoal and 3.5 g of doubly distilled water in a closed outer crucible for creating a reducing atmosphere during firing. $Ba_2B_5O_{9.5-y/2}Br_y$ doped with 0.2 at % $Eu^{2+}$ was obtained. The XRD spectrum of this phosphor is shown in FIG. 1.

The positions of the peaks 2×Theta (2θ) and the corresponding interatomic separations "d" in nanometer (nm) together with their relative peak heights $(I/I_{291\ nm}) \times 100$ are given in Table 1 below:

TABLE 1

| d [nm] | 2θ | $(I/I_{291nm}) \times 100$ |
|---|---|---|
| 0.579 | 15.28 | 23 |
| 0.521 | 17.00 | 7 |
| 0.413 | 21.52 | 34 |
| 0.361 | 24.63 | 7 |
| 0.351 | 25.34 | 14 |
| 0.336 | 26.47 | 24 |
| 0.322 | 27.64 | 12 |
| 0.293 | 30.53 | 66 |
| 0.291 | 30.74 | 100 |
| 0.282 | 31.71 | 15 |
| 0.260 | 34.40 | 24 |
| 0.233 | 38.56 | 10 |
| 0.221 | 40.86 | 14 |
| 0.216 | 41.80 | 12 |
| 0.206 | 43.87 | 21 |
| 0.191 | 47.44 | 17 |
| 0.160 | 57.49 | 8 |

Figure 2:
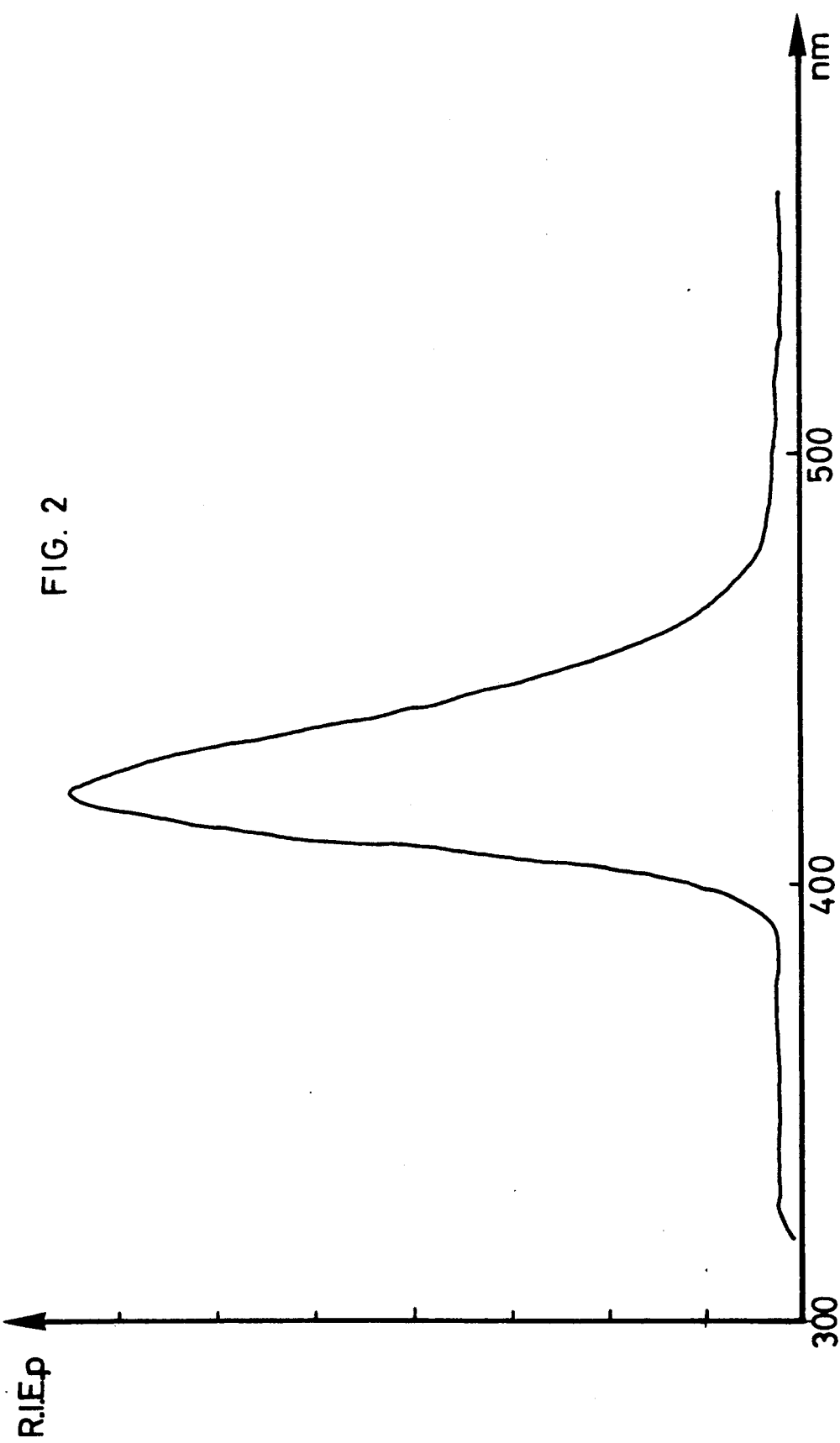

This sample was then subjected to X-ray excitation and the "prompt" emission spectrum determined. This is characterized by a single emission peak at 420.5 nm with a half width of about 35.5 nm as shown in FIG. 2.

The ground powder was then dispersed in a binder solution containing cellulose acetobutyrate dissolved in methyl ethyl ketone. The dispersion obtained was coated onto a 100 μm thick transparent sheet of polyethylene terephthalate to give a coating weight of 1000 g/m2. This screen was then used to determine the energy storage characteristics of the phosphor. After erasing any residual stored energy by irradiating with white light filtered to remove the UV-components, the screen was irradiated with a given dose of X-rays and then stimulated with He-Ne laser light (633 nm) as described hereinbefore. The light obtained during irradiation with the stimulating light was detected with a photomultiplier and the conversion efficiency determined as described hereinbefore.

The light obtained by photostimulation was filtered to remove the residual stimulating light without attenuating the emitted light detected with the photomultiplier.

A prompt emission efficiency of 13.8 pJ/mm2/mR, a conversion efficiency of 1.0 pJ/mm2/mR and a stimulation energy of 110 μJ/mm2 were obtained.

The response time of this phosphor screen was then determined by stimulating the irradiated screen with short laser light pulses from an argon ion laser as described in the text above. The response time being the time to reach half of the maximum energy of emitted light and designated t1/2 was 0.74 μs.

Figure 3:
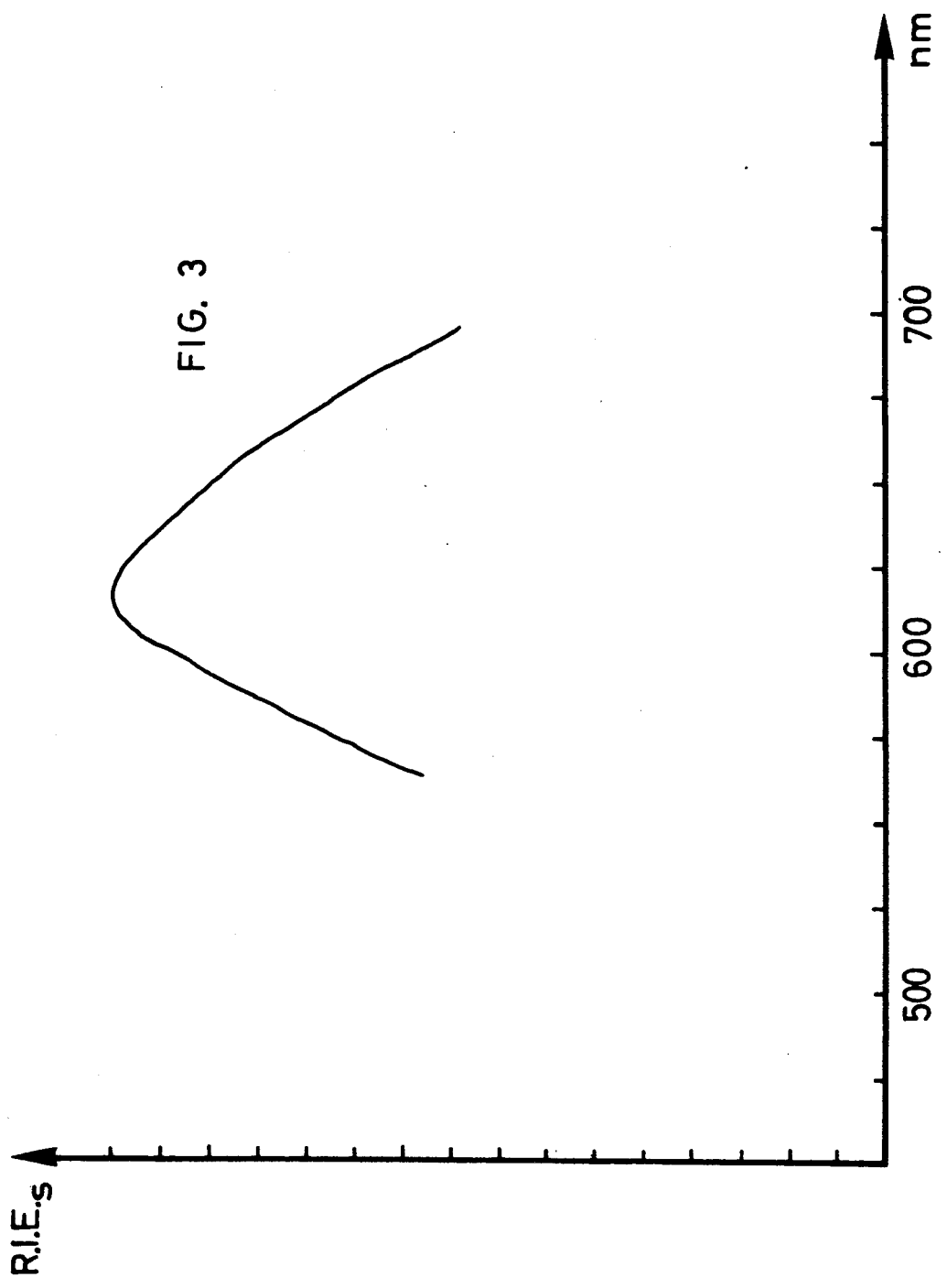
FIGS. 3, 4 and 8 represent stimulation spectra of the phosphors described in the correlated Example. In the diagrams the relative intensity of the stimulated emission (R.I.E.$_S$) at its peak wavelength and the wavelength of the stimulating light in nm is in the abscissa.

Finally the stimulation spectrum of this phosphor was determined as described hereinbefore. This is shown in FIG. 3 and exhibits a peak at about 630 nm.

EXAMPLE 2

5.93636 of $BaCO_3$, 0.01136 g of $Eu_2O_3$, 6.18794 g of $H_3BO_3$ and 3.33217 g of $BaBr_2.2\ H_2O$ were mixed for 15 minutes in a dry state in a planetary ball mill. The mixture was fired in an aluminium oxide crucible for 29 hours at 800° C. in a double crucible arrangement with 10 g of charcoal and 5 g of doubly distilled water in a closed outer crucible for creating a reducing atmosphere during firing.

$Ba_2B_5O_{9.5-y/2}Br_y$ doped with 0.16 at. % $Eu^{2+}$ was obtained as confirmed by its XRD spectrum, see Example 1.

The conversion efficiency and stimulation energy for stimulation with He-Ne laser (633 nm) was determined as described in Example 1 and were 0.12 pJ/mm$^2$/mR and 63 μJ/mm$^2$ respectively. The prompt emission efficiency was 23.1 pJ/mm$^2$/mR.

Figure 4:
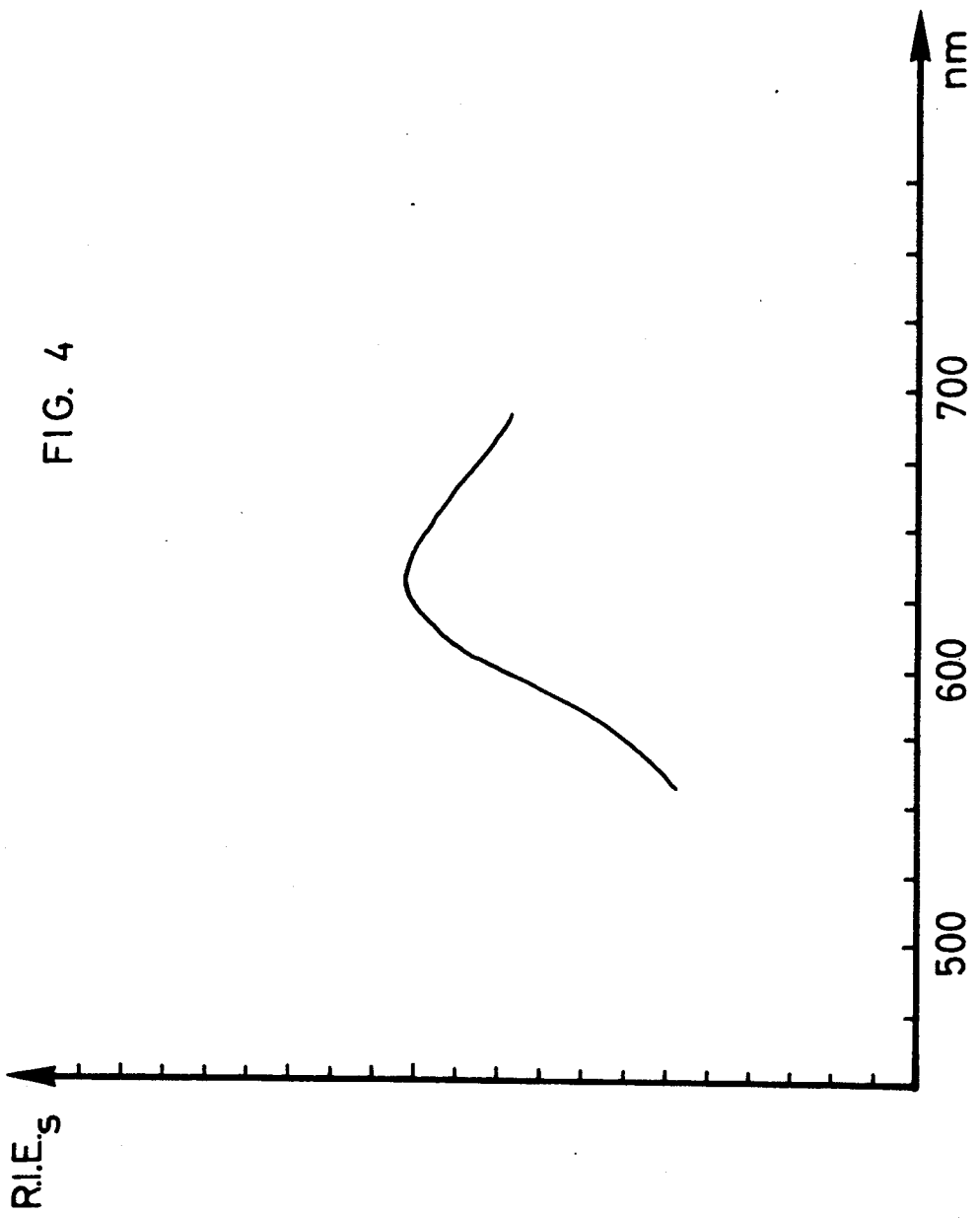

The stimulation spectrum of this phosphor was determined as described hereinbefore. This is shown in FIG. 4 and exhibits a peak at about 630 nm.

Figure 5:
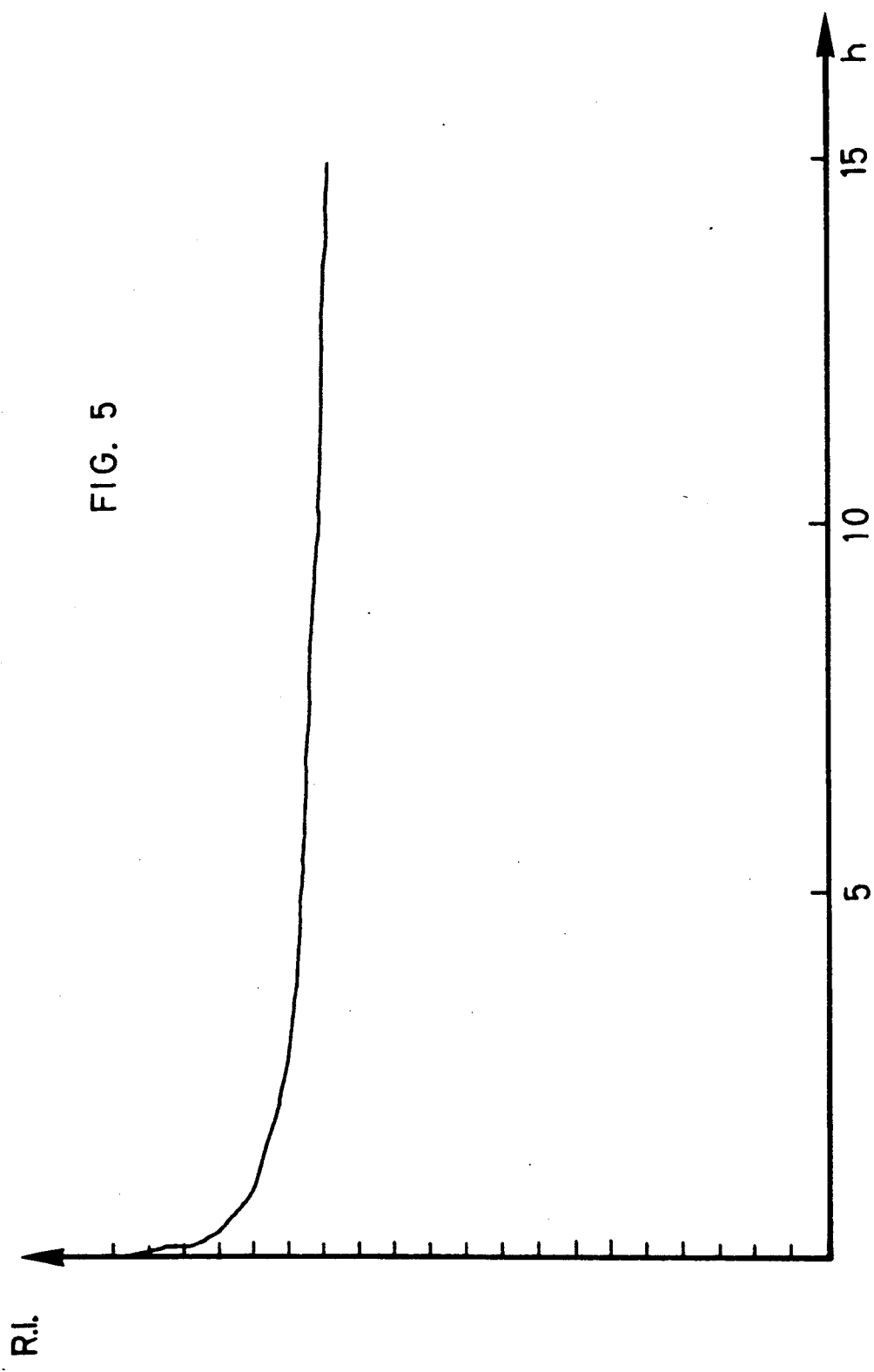
FIG. 5 represents the dark decay curve of the phosphor described in Example 2. In this graph the relative intensity (R.I.) of the stimulated emission at the emission wavelength of the LED used is represented in the ordinate and time in hours is represented in the abscissa.

The dark decay was determined as described hereinbefore and the dark decay curve is shown in FIG. 5 wherefrom can be learned that the dark decay proceeds very slowly at room temperature.

EXAMPLE 3

5.9202 g of $BaCO_3$, 0.01407 g of $Eu_2O_3$, 2.4427 g of $BaCl_2.2\ H_2O$ and 6.183 g of $H_3BO_3$ were mixed for 15 minutes with 7 ml of ethanol in a planetary ball mill. The mixture was fired in an aluminium oxide crucible for 6 h at 850° C. in an atmosphere of 99.8% by volume of nitrogen and 0.2% by volume of hydrogen.

$Ba_2B_5O_{9.5-y/2}Cl_y$ doped with 0.2% $Eu^{2+}$ was obtained as confirmed by its XRD spectrum, the XRD spectrum of this phosphor having been described already in 1970 by T. E. Peters and J. Baglio in Journal Inorg. Nucl.Chem, Vol. 32 pp. 1089 to 1095.

Figure 6:
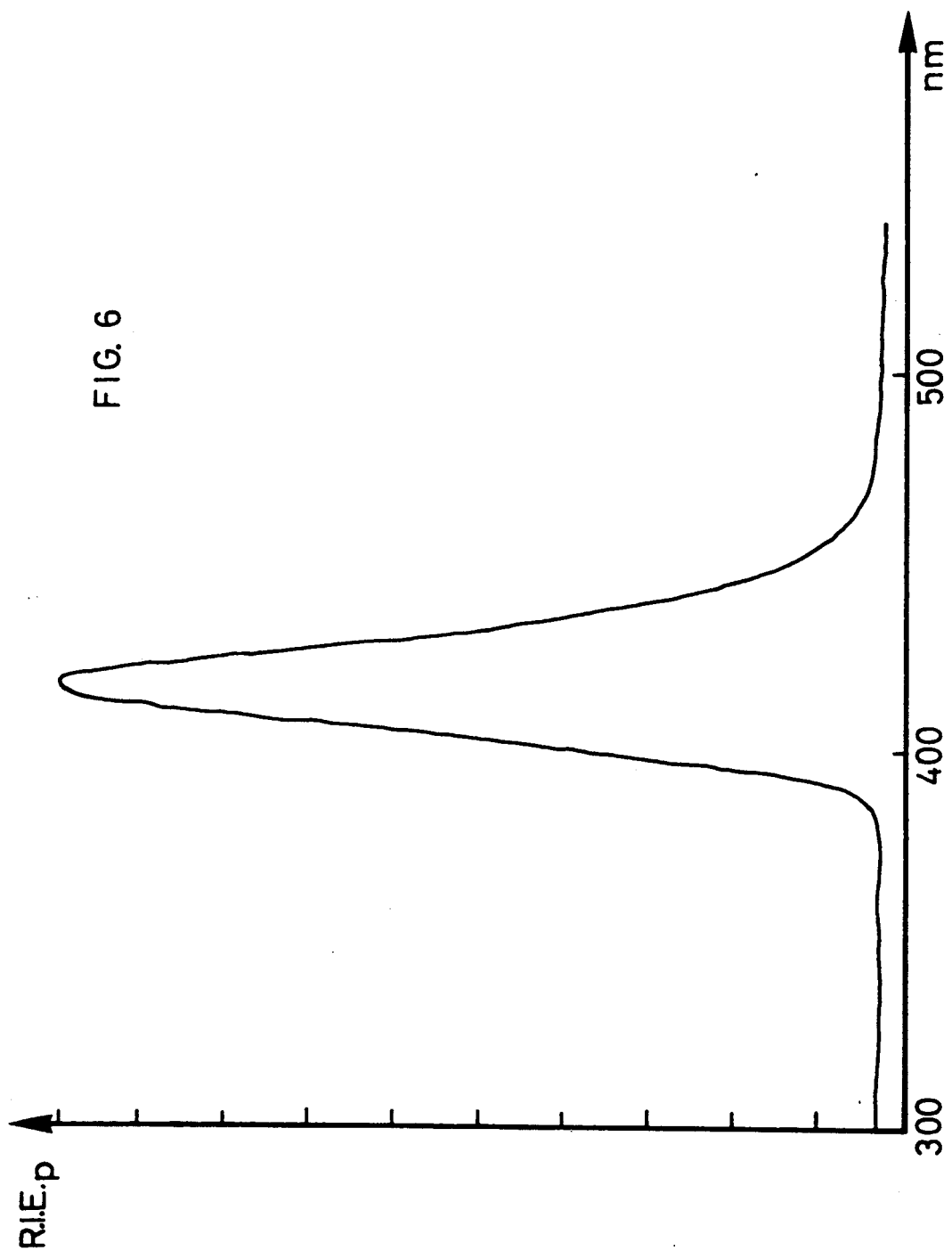

The prompt emission spectrum of this phosphor was measured as described in Example 1. This is characterized by a single emission peak at 417 nm with a half width of about 31 nm as shown in FIG. 6. The conversion efficiency and stimulation energy for stimulation with a He-Ne laser (633 nm) was determined as described in example 1 and were 0.05 pJ/mm$^2$/mR and 195 μJ/mm$^2$ respectively.

EXAMPLE 4

4.4289 g of $SrCO_3$, 0.01407 g of $Eu_2O_3$, 3.5552 of $SrBr_2.6H_2O$ and 6.36849 g of $H_3BO_3$ were mixed with 7 ml of ethanol in a planetary ball mill for 15 minutes. The mixture was fired in an aluminium oxide crucible for 6 hours at 850° C. in a double crucible arrangement with 7 g of charcoal and 3.5 ml of double distilled water in a closed outer crucible. $Sr_2B_5O_{9.5-y/2}Br_y$ doped with 0.2 at % $Eu^{2+}$ was obtained as confirmed by its XRD spectrum. The XRD spectrum of said phosphor is also described in J. Inorg. Nucl. Chem. (1970), Vol. 32, pages 1089–1095.

Figure 7:
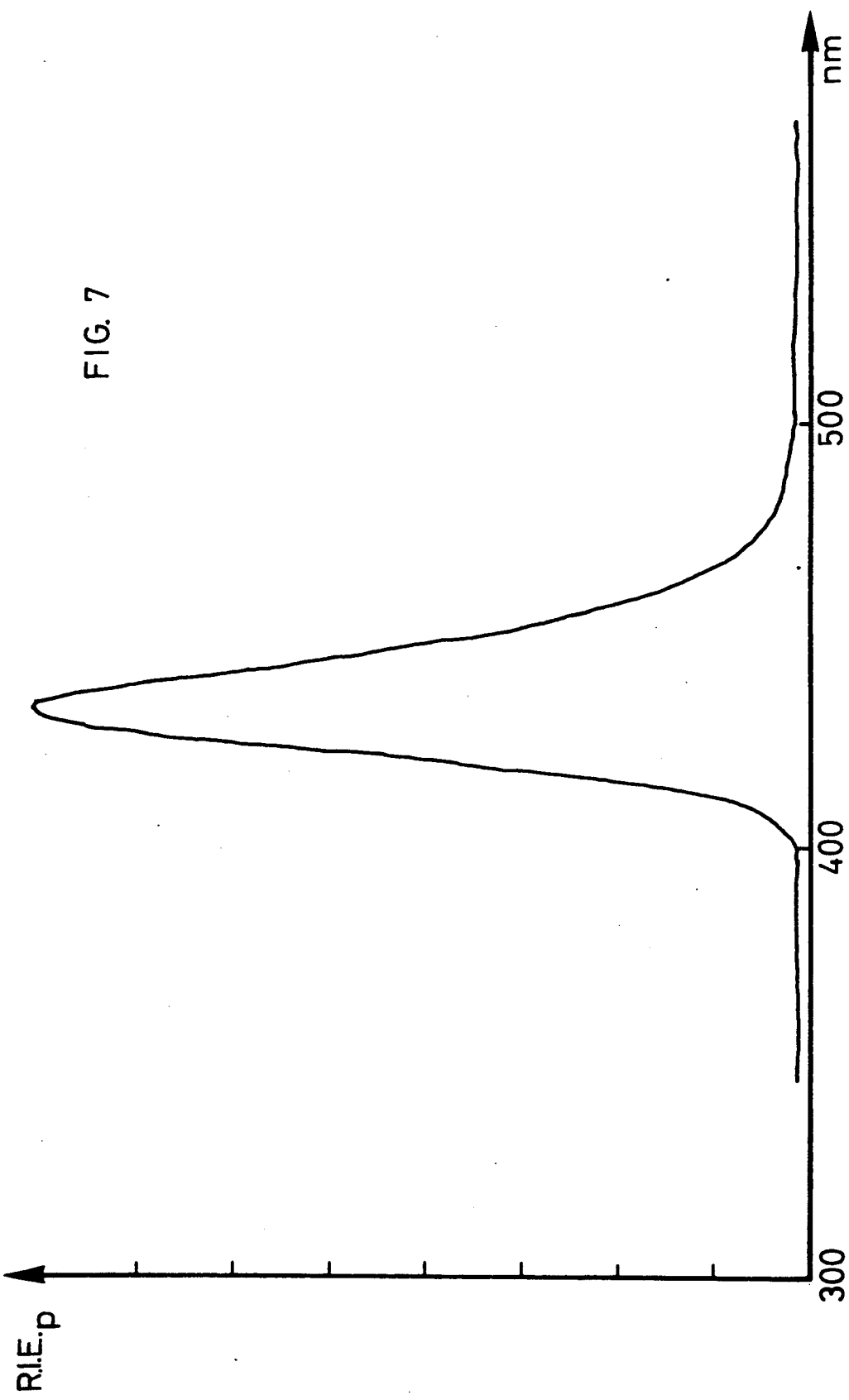

The prompt emission spectrum of this phosphor was measured. It is characterized by a single emission peak at 431.5 nm with a half width of about 27.5 nm as shown in FIG. 7.

A prompt emission efficiency of 9.4 pJ/mm$^2$/mR, a conversion efficiency of 0.10 pJ/mm$^2$/mR and a stimulation energy of 75 μJ/mm$^2$ were obtained.

Figure 8:
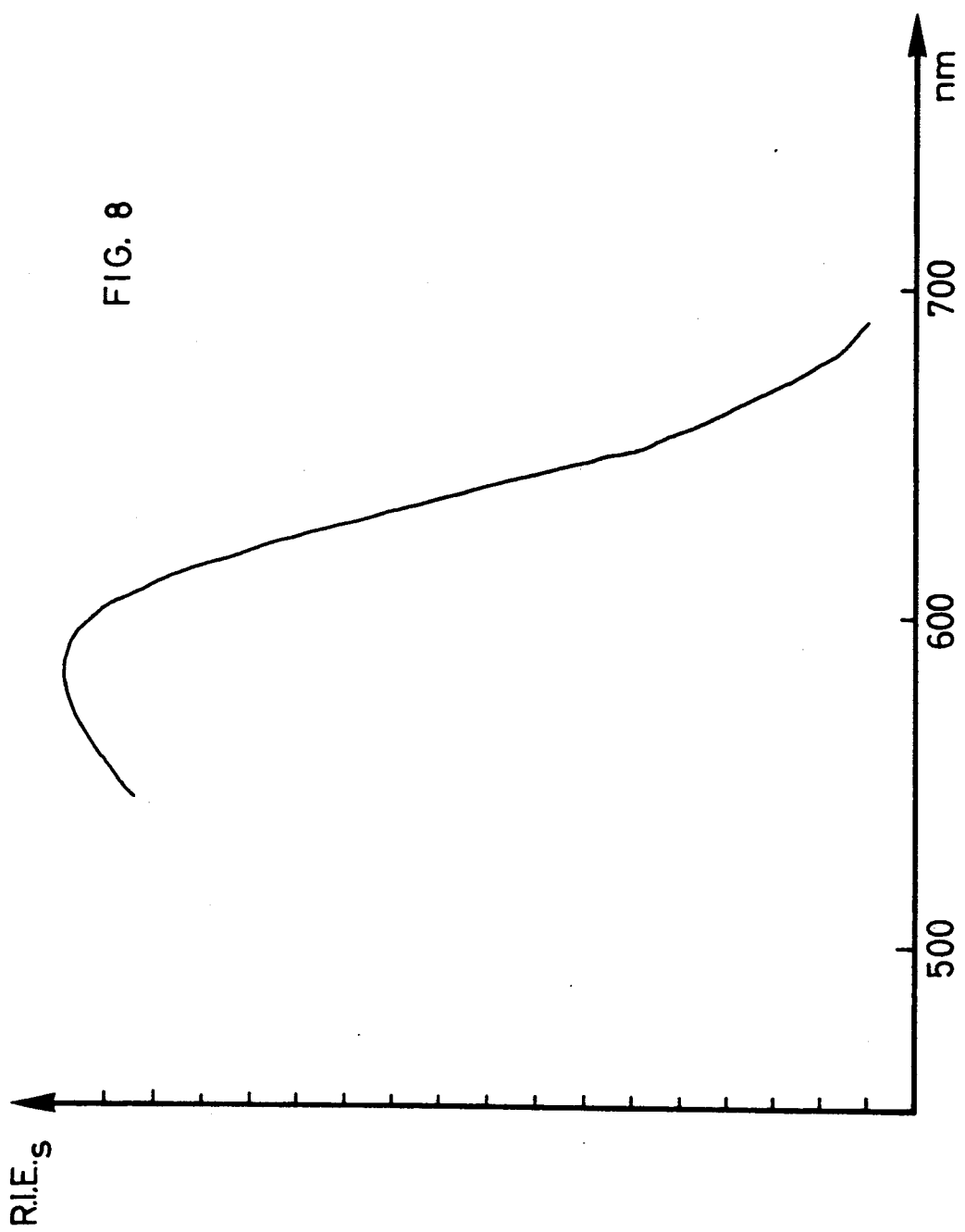

The stimulation spectrum for this phosphor was determined as described in Example 1. This is shown in FIG. 8 and exhibits a peak at about 580 nm.

The response time t1/2 was 0.80 μs.

EXAMPLE 5

4.4289 g of $SrCO_3$, 0.01407 g of $Eu_2O_3$, 2.6662 of $SrCl_2.6H_2O$ and 6.1849 g of $H_3BO_3$ were mixed with 7 ml ethanol in a planetary ball mill for 15 minutes. The mixture was fired in an aluminium oxide crucible for 15 hours at 850° C. in a double crucible arrangement with 7 g of charcoal and 3.5 ml of double distilled water in a closed outer crucible. $Sr_2B_5O_{9.5-y/2}Cl_y$ doped with 0.2 at % $Eu^{2+}$ was obtained as confirmed by its XRD spectrum. The XRD spectrum of this phosphor is also described in J. Inorg. Nucl.Chem. (1970), Vol 32, pages 1089–1095.

The prompt emission spectrum is characterized by a single peak at 427 nm with a half width of about 35.5 nm as shown in FIG. 9.

A prompt emission efficiency of 4.2 pJ/mm$^2$/mR, a conversion efficiency of 0.004 pJ/mm$^2$/mR and a stimulation energy of 32 uJ/mm$^2$ were obtained. The response time t1/2 was 0.90 μs.

EXAMPLES 6 to 17

The phosphors of Examples 6 to 17 were prepared using 5.9 of $BaCO_3$, 4 g of anhydrous $BaBr_2$ (=33% molar excess), 7 g of $H_3BO_3$ (=10% molar excess) with the addition of an appropriate quantity of $Eu_2O_3$ before firing yielding phosphors with concentrations of 0.002 at %, 0,005 at %, 0.010 at %; 0.020 at %, 0.050 at %, 0.100 at %, 0.200 at %, 0.500 at %, 1.000 at %, 2.000 at %, 5.000 at % and 10.000 at % of $Eu^{2+}$ respectively.

The mixtures were fired in aluminium oxide crucibles for 3 hours at 400° C. and afterwards for 4 hours at 875° C. all the time in nitrogen atmosphere.

Screens were cast with these phosphors as described in Example 1. The conversion efficiencies and stimulation energies for 633 nm stimulation were determined as described in Example 1 and are summarized in Table 2.

TABLE 2

| Example No. | Europium concentration [at %] | for 633 nm stimulation | |
|---|---|---|---|
| | | Conversion efficiency [pJ/mm2/mR] | Stimulation energy [μJ/mm2] |
| 6  | 0.002  | 0.01 | 23  |
| 7  | 0.005  | 0.09 | 119 |
| 8  | 0.010  | 0.14 | 81  |
| 9  | 0.020  | 0.25 | 101 |
| 10 | 0.050  | 0.27 | 74  |
| 11 | 0.100  | 0.38 | 84  |
| 12 | 0.200  | 0.46 | 86  |
| 13 | 0.500  | 0.44 | 89  |
| 14 | 1.000  | 0.43 | 79  |
| 15 | 2.000  | 0.47 | 88  |
| 16 | 5.000  | 0.19 | 78  |
| 17 | 10.000 | 0.22 | 73  |

EXAMPLES 18 and 19

The phosphors of Examples 18 and 19 were prepared using similar techniques to that for Example 13 with the addition of an appropriate quantity of gadolinium oxide or sodium oxide before firing yielding phosphors with a gadolinium or sodium co-activator concentration of 0.5 at % and with an europium concentration of 0.5 at %.

Screens were cast with these phosphors as described in Example 1. The conversion efficiency and stimulation energy for 633 nm stimulation were determined as described in Example 1 and are summarized in Table 3.

TABLE 3

| Example No. | europium concentration [at %] | Gadolinium concentration [at %] | Sodium concentration [at %] | for 633 nm stimulation | |
|---|---|---|---|---|---|
| | | | | Conversion efficiency [pJ/mm2/mR] | Stimulation energy [μJ/mm2] |
| 18 | 0.5 | —   | 0.5 | 0.17 | 107 |
| 19 | 0.5 | 0.5 | —   | 0.20 | 78  |

EXAMPLE 20

1.9735 g of $Ba_{0.9925}$:$Eu_{0.0075}CO_3$, 4.9335 g of $BaCO_3$, 1.2213 g of $BaCl_2.H_2O$, 2.1396 g of $NH_4Cl$ and 3.4959 g of $B_2O_3$ were mixed dry in a planetary ball mill for 15 minutes. The mixture was fired at 850° C. for 11 hours in an aluminum oxide crucible covered with an aluminum oxide lid.

After the first firing the sample was ground and refired at 850° C. for 2 hours. Both firings were followed by quenching (a sudden cooling down to room temperature of the fired samples). The firings proceeded in an atmosphere of 0.2% by volume of hydrogen and 99.8% by volume of nitrogen.

$Ba_2B_5O_{9.5-y/2}Cl_y$ doped with 0.2% $Eu^{2+}$ was obtained as confirmed by its XRD spectrum. The XRD spectrum of this phosphor has been described already in 1970 by T. E. Peters and J. Baglio in Journal Inorg. Nucl. Chem. Vol. 32, p. 1089 to 1095.

The conversion efficiency and stimulation energy for stimulation with a He-Ne laser (633 nm) was determined as described in Example 1 and were 0.325 pJ/mm²/mR and 92.8 μmJ/mm² respectively.

EXAMPLE 21

6.9091 g of (Ba:Eu)$CO_3$, 1.8721 g of $NH_4Cl$, 0.7247 g of $NH_4I$, 1.2212 g of $BaCl_2.2 H_2O$ and 3.4972 g of $B_2O_3$ were mixed in a planetary ball mill for 15 minutes.

The mixture was fired in a covered aluminum oxide crucible for 11 hours at 850° C. in a 0.2% by volume of hydrogen and 99.8% by volume of nitrogen atmosphere. The mixture was taken from the oven in hot state and quenched.

The product being an europium doped $Ba_2B_5O_{9.5-y/2}(Cl_{0.9},I_{0.1})_y$ has a similar structure to $Ba_2B_5O_9Cl$ as shown by its similar XRD spectrum to that reported in 1970 by T. E. Peters and J. Baglio in Journal Inorg. Nucl. Chem. Vol. 32, p. 1089-1095.

The conversion efficiency and stimulation energy for stimulation with a He-Ne laser (633 nm) was determined as described in Example 1 and were 0.107 pJ/mm²/mR and 264 μmJ/mm² respectively.

We claim:

1. A method for recording and reproducing an X-ray image which method comprises the steps of:
   (1) causing a photostimulable phosphor to absorb image-wise or pattern-wise modulated X-rays,
   (2) exposing said phosphor with visible light or infrared light capable of photostimulating said phosphor to release therefrom in accordance with the absorbed X-rays an electromagnetic radiation different in wavelength characteristic from the visible light used in the photostimulation, and
   (3) detecting said electromagnetic radiation emitted by photostimulation, wherein said phosphor is a haloborate corresponding to the following empirical formula (I):

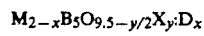

$$M_{2-x}B_5O_{9.5-y/2}X_y:D_x$$

wherein:
M is at least one of the alkaline earth metals selected from the group consisting of Ca, Sr and Ba,
X is at least one of halogen selected from the group consisting of Cl, Br and I,
D is a dopant being at least one rare earth metal selected from the group consisting of $Eu^{2+}$ and $Ce^{3+}$, optionally in combination with at least one co-dopant being a member selected from the group consisting of La, Y, Sc and the lanthanide elements except $Eu^{2+}$ and $Ce^{3+}$ or one or more alkali elements selected from the group consisting of Na, K, Rb and Cs, said co-dopant being present in a concentration equal to the concentration of the said rare earth metal,
x is in the range $5 \times 10^{-5} \leq x < 4 \times 10^{-1}$, and
y is in the range $0.4 \leq y \leq 1.6$.

2. A method according to claim 1, wherein the phosphor corresponds to said empirical formula (I) in which M is at least one element of the group consisting of Sr and Ba; X is at least one element of the group consisting of Cl and Br; D represents a member selected from the group consisting of $Eu^{2+}$ and $Ce^{3+}$ optionally in combination with at least one member selected from the group of La, Y, Sc and the lanthanide elements other than $Eu^{2+}$ and $Ce^{3+}$ or one or more alkali elements selected from the group consisting of Na and K.

3. A method according to claim 2, wherein x is in the range $10^{-4} \leq x \leq 5 \times 10^{-2}$.

4. A method according to claim 1, wherein the photostimulation proceeds with a He-Ne laser.

5. A method according to claim 1, wherein the detection of the light emitted by photostimulation proceeds with a phototube providing electrical signals that are digitized and stored.

6. A method according to claim 5, wherein after storage said signals are subjected to digital processing.

7. A method according to claim 5, wherein digital signals obtained from analog-digital conversion of the electrical signals corresponding with the light obtained through photostimulation are displayed on a cathode-ray tube.

8. A method according to claim 5, wherein the digital signals are transformed into analog signals that are used to modulate a writing laser beam.

9. A method according to claim 8, wherein the modulated laser beam is used to scan a photographic material.

* * * * *